US010996767B2

(12) United States Patent
Iyer et al.

(10) Patent No.: US 10,996,767 B2
(45) Date of Patent: May 4, 2021

(54) MANAGEMENT OF USER CONTEXT FOR OPERATION OF IHS PERIPHERALS

(71) Applicant: Dell Products, L.P., Round Rock, TX (US)

(72) Inventors: Vivek Viswanathan Iyer, Austin, TX (US); Karthikeyan Krishnakumar, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/521,972

(22) Filed: Jul. 25, 2019

(65) Prior Publication Data

US 2021/0026460 A1 Jan. 28, 2021

(51) Int. Cl.
 *G06F 3/00* (2006.01)
 *G06F 3/02* (2006.01)
 *G06F 3/01* (2006.01)
 *H04L 12/24* (2006.01)

(52) U.S. Cl.
 CPC ............ *G06F 3/0227* (2013.01); *G06F 3/017* (2013.01); *G06F 3/0208* (2013.01); *H04L 41/022* (2013.01); *H04L 41/0816* (2013.01)

(58) Field of Classification Search
 CPC .............................. G06F 3/0227; G06F 3/0208
 See application file for complete search history.

(56) References Cited

U.S. PATENT DOCUMENTS

| 8,370,030 B1* | 2/2013 | Gurin ................. B60R 1/00 180/272 |
| 9,001,158 B2* | 4/2015 | de Paz ................. G06F 3/1423 345/659 |
| 2010/0211636 A1* | 8/2010 | Starkenburg ....... H04N 7/17318 709/203 |

OTHER PUBLICATIONS

Dell, "How Do I Use Near Field Communication (NFC) on Dell Systems?," 3 pages, retrieved Apr. 26, 2019, available at https://www.dell.com/support/article/us/en/19/sln292603/how-do-i-use-near-field-communication-nfc-on-dell-systems?lang=en.
Microsoft, "Near Field Communications," 4 pages, retrieved Apr. 26, 2019, available at https://docs.microsoft.com/en-us/windows-hardware/design/component-guidelines/near-field-communications.
Microsoft, "Supported Configurations for System Center Configuration Manager," 3 pages, retrieved Apr. 26, 2019, available at https://docs.microsoft.com/en-us/sccm/core/plan-design/configs/supported-configurations.
Microsoft, "Advantages of Writing UMDF Drivers," 2 pages, retrieved Apr. 26, 2019, available at https://docs.microsoft.com/en-us/sccm/core/plan-design/configs/supported-configurations.

(Continued)

*Primary Examiner* — Henry Tsai
*Assistant Examiner* — Dean Phan
(74) *Attorney, Agent, or Firm* — Fogarty LLP (57) ABSTRACT

An IHS (Information Handling System) may support a variety of types of peripheral devices that may each be customized for operation by a specific user. Embodiments provide management of peripherals devices based on the context of the use of the IHS by the specific user. Upon detecting a login by a user, a plurality of peripheral device settings associated with that user are retrieved from a remote management service. A context of use of the IHS is determined based in part on the physical configuration of the IHS, applications that are currently in use, and other indicators of a mode of operation of the IHS. Based on the context of use and the peripherals coupled to the IHS, settings are selected from the user's retrieved peripheral device settings. The peripheral devices are configured based on the selected settings.

20 Claims, 5 Drawing Sheets

(56) References Cited

OTHER PUBLICATIONS

Microsoft, "UserPreferenceCategory Enum," 4 pages, retrieved Apr. 26, 2019, available at https://docs.microsoft.com/en-us/dotnet/api/microsoft.win32.userpreferencecategory?view=netframework-4.7.2.

Microsoft, "SetSysColors function," 5 pages, retrieved Apr. 26, 2019, available at https://docs.microsoft.com/en-us/windows/desktop/api/winuser/nf-winuser-setsyscolors.

Microsoft, "ChangeDisplaySettingsA function," 7 pages, retrieved Apr. 26, 2019, available at https://docs.microsoft.com/en-us/windows/desktop/api/winuser/nf-winuser-changedisplaysettingsa.

* cited by examiner

MANAGEMENT OF USER CONTEXT FOR OPERATION OF IHS PERIPHERALS

FIELD

This disclosure relates generally to Information Handling Systems (IHSs), and more specifically, to managing use of peripheral devices coupled to IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

A wide variety of peripheral devices may be coupled to an IHS using wired and wireless communication technologies through a range of communication interfaces supported by the IHS. The operation of any certain peripheral devices may be configured for use by a particular user via settings that may be manually specified by the user or that may be automatically specified, such as through machine learning. In some scenarios, a user may switch between different IHSs throughout each day, such as using one IHS for business use and another IHS for personal use. In enterprise settings, users may be assigned a new IHS as a temporary or permanent replacement for a malfunctioning IHS.

SUMMARY

In various embodiments, a method is provided for managing the operation of peripheral devices coupled to a first Information Handling System (IHS). The method includes: detecting a login by a first user of the first IHS; retrieving, from a remote management service, a plurality of peripheral device settings associated with the first user; determining a context of use of the first IHS; selecting a plurality of settings from the retrieved peripheral device settings of the user, wherein the settings are selected based the context of use of the first IHS and based on a first plurality of peripheral devices coupled to the first IHS; and configuring the first plurality of peripheral devices for operation by the first user, wherein the first plurality of peripheral devices are configured based on the selected settings.

In additional method embodiments, the IHS is a dual-panel, convertible IHS, and wherein a physical posture of the IHS is configured through positioning of the dual panels, and wherein the context of use of the IHS is determined at least in part based on the physical posture. In additional method embodiments, the peripheral devices settings of the user configure a peripheral device specifically for operation by the user. In additional embodiments, the method further includes adapting the selected settings to disregard settings that are incompatible with the first plurality of peripheral devices. In additional embodiments, the method further includes detecting a login by the first user of a second IHS; retrieving, from the remote management service, the plurality of peripheral device settings associated with the first user; determining a context of use of the second IHS; selecting a plurality of settings from the retrieved peripheral device settings of the user, wherein the settings are selected based the context of use of the second IHS and based on a first plurality of peripheral devices coupled to the second IHS; and configuring the first plurality of peripheral devices for operation by the first user, wherein the first plurality of peripheral devices are configured based on the selected settings. In additional method embodiments, the physical posture of the first IHS comprises at least one of a tablet mode, a laptop mode, a tent mode, a landscape mode and a book mode. In additional method embodiments, the peripheral devices settings comprise settings generated by the user and settings generated based on machine learning trained through observations of peripheral device operation by the user. In additional method embodiments, the adaptation of the selected settings comprises disregarding the settings generated based on machine learning. In additional method embodiments, the context of use of the IHS is determined at least in part based on software applications of the IHS in use by the user.

In additional embodiments, a first Information Handling System (IHS) is configured for managing the operation of peripheral devices coupled to the first IHS. The IHS includes: one or more processors; and a memory device coupled to the one or more processors, the memory device storing computer-readable instructions that, upon execution by the one or more processors, cause the system to: detect a login by a first user of the first IHS; retrieve, from a remote management service, a plurality of peripheral device settings associated with the first user; determine a context of use of the first IHS; select a plurality of settings from the retrieved peripheral device settings of the user, wherein the settings are selected based the context of use of the first IHS and based on a first plurality of peripheral devices coupled to the first IHS; and configure the first plurality of peripheral devices for operation by the first user, wherein the first plurality of peripheral devices are configured based on the selected settings.

In additional IHS embodiments, the IHS is a dual-panel, convertible IHS and wherein the physical posture of the IHS is configured through positioning of the dual panels, and wherein the context of use of the IHS is determined at least in part based on the physical posture. In additional IHS embodiments, the context of use of the IHS is further determined at least in part based on software applications of the IHS in use by the user. In additional IHS embodiments, the peripheral devices settings of the user configure a peripheral device for operation specifically for the user. In additional IHS embodiments, the system also adapts the selected settings to disregard settings that are incompatible with the first plurality of peripheral devices. In additional IHS embodiments, the physical posture of the first IHS comprises at least one of a tablet mode, a laptop mode, a tent mode, a landscape mode and a book mode.

In additional embodiments, a computer-readable storage device includes program instructions stored thereon for managing the operation of peripheral devices coupled to a first Information Handling System (IHS), upon execution by one or more processors, the program instructions cause the one or more processors to: detect a login by a first user of the first IHS; retrieve, from a remote management service, a plurality of peripheral device settings associated with the first user; determine a context of use of the first IHS; select a plurality of settings from the retrieved peripheral device settings of the user, wherein the settings are selected based the context of use of the first IHS and based on a first plurality of peripheral devices coupled to the first IHS; and configure the first plurality of peripheral devices for operation by the first user, wherein the first plurality of peripheral devices are configured based on the selected settings.

In additional storage device embodiments, the IHS is a dual-panel, convertible IHS, and wherein a physical posture of the IHS is configured through positioning of the dual panels, and wherein the context of use of the IHS is determined at least in part based on the physical posture. In additional storage device embodiments, the context of use of the IHS is further determined at least in part based on software applications of the IHS in use by the user. In additional storage device embodiments, the peripheral devices settings of the user configure a peripheral device specifically for operation by the user. In additional storage device embodiments, the physical posture of the first IHS comprises at least one of a tablet mode, a laptop mode, a tent mode, a landscape mode and a book mode.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
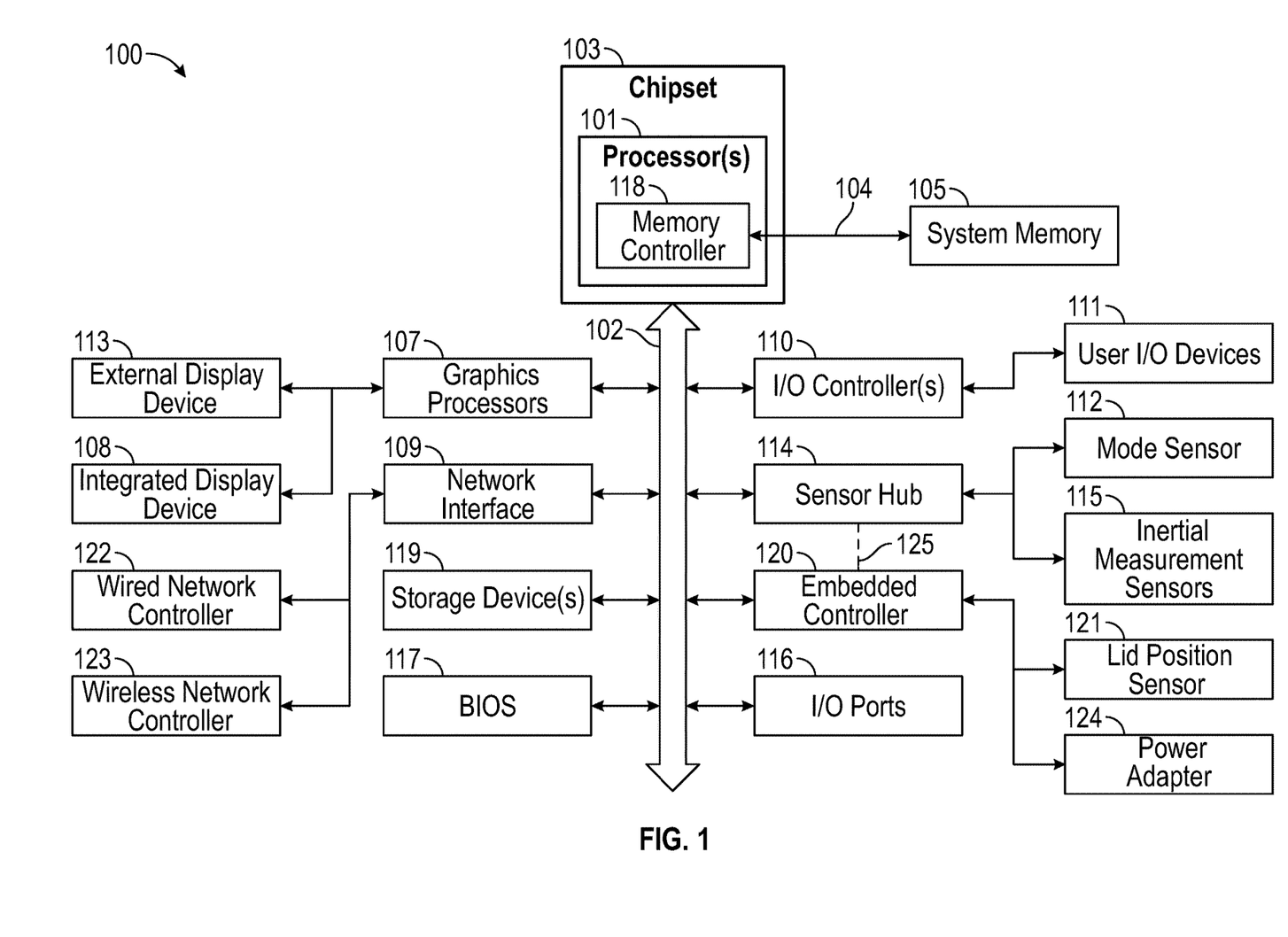
FIG. 1 is a block diagram depicting certain components of an IHS configured according to various embodiments for management of user contexts for the operation of peripherals coupled to the IHS.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

As described, an IHS may support use of a variety of different types of peripheral devices through wired and wireless couplings. In some instances, peripheral devices may be customized for operation by a specific user. For instance, the sensitivity of the operation of pointing devices may be configured for a particular user. For a pointing device such as a mouse, the operation of the mouse buttons may be further customized, both in regards to the functions and their sensitivity. In other instances, keyboard operations may be customized to provide specialized key mappings and may also be customized to account for specific habits of operation by a particular user, such as through machine learning techniques that identify and compensate for certain key entry tendencies of a particular user. The operation of various peripherals may be similarly customized to support ease of operation for a particular user. Such customizations of peripheral devices are conventionally configured separately for each peripheral and for each IHS operated by a particular user. In addition, such conventional customizations of peripheral devices are static and do not account for different postures or modes in which an IHS may be configured, nor do they account for the applications that are in use.

FIG. 1 is a block diagram illustrating certain components of an IHS 100 configured according to certain embodiments for management of user contexts for the operation of peripherals coupled to the IHS. In various embodiments, IHS 100 may include an embedded controller 120 that may execute program instructions that perform certain of the operations disclosed herein for configuration of peripherals coupled to IHS 100. In certain embodiments, IHS 100 may be configured as a member of an enterprise network by which a variety of computing services may be provided to a user of IHS 100. In certain embodiments, an enterprise network may include access to remote computing services described herein for management of user contexts for the operation of peripherals coupled to other IHSs that are configured similarly to IHS 100. Such computing services provided by the enterprise network support the consistent operation of peripherals across the different IHSs that may be operated by a particular user.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to or instead of USB ports, I/O ports 116 may include various types of physical I/O ports that are accessible to a user via the enclosure of the IHS 100. As described in additional detail below, in various embodiments, configurable aspects of peripheral devices that are coupled to IHS 100 via I/O ports 116 may be managed based on the context of the user's operation of IHS 100 and any similarly configured IHSs.

In certain embodiments, chipset 103 may additionally utilize one or more I/O controllers 110 that may each support the operation of hardware components such as user I/O devices 111 that may include peripheral components that are physically coupled to an I/O port 116 and/or peripheral components that are wirelessly coupled to IHS 100 via a network interface 109. In various embodiments, I/O controller 110 may support the operation of one or more user I/O devices 110 such as a keyboard, mouse, touchpad, touch-screen, microphone, speakers, camera and other input and output devices that may be coupled to IHS 100. As described, user I/O devices 111 may interface with an I/O controller 110 through wired or wireless couplings supported by IHS 100. In certain embodiments, I/O controllers 110 may support configurable operation of supported peripheral devices, such as user I/O devices 110. In various embodiments, I/O controllers 110 may be configured to support for management of certain configurable aspects of peripheral devices, where the management may be based on the physical posture in which IHS 100 is configured. I/O controllers 110 may be additionally or alternatively configured to support consistent configuration of peripherals for a particular user across IHS 100 and other IHSs that are similarly configured to IHS 100.

As illustrated, a variety of additional resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NICs) 122, 123, each of which may implement the hardware required for communicating via a specific networking technology, such as W-Fi, BLUETOOTH, Ethernet and mobile cellular networks (e.g., CDMA, TDMA, LTE). As illustrated, network interface 109 may support network connections by wired network controllers 122 and wireless network controllers 123. Each network controller 122, 123 may be coupled via various buses to the chipset 103 of IHS 100 in supporting different types of network connectivity, such as the network connectivity utilized by the operating system of IHS 100. In certain embodiments, network controllers 122 and/or 123 may be used to support connections to an enterprise network that supports management of user contexts for the operation of peripherals coupled to IHS 100 and for the consistent operation of peripherals coupled to other IHS that are configured similarly to IHS 100.

Chipset 103 may also provide access to one or more display device(s) 108, 113 via graphics processor 107. In certain embodiments, graphics processor 107 may be comprised within a video card, graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. In some embodiments, power to graphics processor 107, integrated display device 108 and/or external display 133 may be turned off, or configured to operate at minimal power levels, in response to IHS 100 entering a low-power state.

As illustrated, IHS 100 may support an integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to an external I/O port 116 of the IHS 100. In certain scenarios, the operation of integrated displays 108 and external displays 113 may be configured for a particular user. For instance, a particular user may prefer specific brightness settings that may vary the display brightness based on time of day and ambient lighting conditions. In certain embodiments, such configurable aspects of the operation of integrated displays 108 and external displays 113 may be managed based on the context of the operation by the user such that consistent display settings are provided for the user while operating IHS 100 as well as other IHSs that are similarly configured to IHS 100.

Chipset 103 also provides processor 101 with access to one or more storage devices 119. In various embodiments, storage device 119 may be integral to the IHS 100 or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In certain embodiments, the initialization of IHS 100 by BIOS 117 may be paused to allow for the validation of instructions utilized by a trusted component, such as secure processor 127, in order to establish a hardware root of trust in the trusted component that may then be utilized to support certain secure operations of IHS 100, such as user authentication.

As illustrated, certain IHS 100 embodiments may utilize a sensor hub 114 capable of determining the relative orientation and movement of IHS 100. For instance, sensor hub 114 may utilize inertial movement sensors 115, that may include accelerometer, gyroscope and magnetometer sensors and are capable of determining the current orientation and movement of IHS 100 (e.g., IHS 100 is motionless on a relatively flat surface or IHS 100 is being moved irregularly and is likely in transport or in mobile use). In certain embodiments, sensor hub 114 may also include capabilities for determining a location and movement of IHS 100 based on triangulation of network signal information and/or based on information accessible via the operating system or a location subsystem, such as a GPS module. In some embodiments, sensor hub 114 may support additional sensors, such as optical, infrared and sonar sensors, that may provide support for xR (virtual, augmented, mixed reality) sessions hosted by the IHS 100 and may be used by sensor hub 114 provide an indication of a user's presence near IHS 100.

In embodiments where IHS 100 may support multiple physical configurations, such as the convertible laptop described below with regard to FIGS. 2A-D, sensor hub 114 may include a mode sensor 112 capability that provides a determination of the current mode in which the IHS 100 is physically configured. In certain embodiments, such physical mode determinations may be made using the movement and orientation determinations made by the sensor hub 114 using the inertial movement sensors 115. In embodiments where IHS 100 is a laptop or a convertible laptop, sensor hub 114 may further utilize a hinge angle sensor to determine the relative angle between the two panels of the laptop in order to determine the mode in which IHS 100 is physically configured. In certain embodiments, the physical configuration of a convertible IHS may be further evaluated based on the location of the IHS in order to more accurately determine a mode of operation of the IHS. For instance, use of tent mode at a work location may indicate the use of IHS 100 for monitoring email, while use of this same mode at a home location may indicate the use of IHS 100 for viewing streaming media, with these different modes of IHS 100 having different peripheral settings associated with them.

In certain instances, sensor hub 114 may determine the mode in which a convertible laptop IHS 100 is configured based solely on the angle of rotation of the hinge of IHS 100 from a closed position. For instance, a first range of angles of rotation from a closed position may indicate a laptop configuration, a second range of angles may indicate a landscape configuration and a third range of angles may indicate a tablet configuration. In certain embodiments, the sensor hub 114 may additionally or alternatively utilize orientation and movement information to determine the mode in which IHS 100 is physically configured. For instance, if the sensor hub 114 determines the IHS 100 is configured with a hinge angle of a laptop configuration, but the IHS 100 is oriented on its side, the IHS may be determined to be in a book mode. If the IHS 100 is determined to be tiled towards a user's face and is experiencing slight movement, the sensor hub 113 may further determine with significant certainty that the IHS 100 is being used in a book mode configuration.

In this same manner, the sensor hub 114 may determine that when the IHS 100 is opened such that it lies on a flat surface, the IHS is being used in a landscape mode. The sensor hub 114 may similarly determine IHS 100 is in a tent configuration, such as illustrated in FIG. 2B, based on the hinge angle and the orientation in which the hinge is pointed upwards. As described in additional detail with regard to the below embodiments, such mode determinations made by sensor hub 114 may provide a context in which peripherals coupled to IHS 100 may be used.

In certain embodiments, sensor hub 114 may be an independent microcontroller or other logic unit that is coupled to the motherboard of IHS 100. In certain embodiments, sensor hub 114 may be a component of an integrated system-on-chip incorporated into processor 101 In some embodiments, sensor hub 114 may communicate with chipset 103 of processor 101 via a bus connection such as an Inter-Integrated Circuit (I2C) bus or other suitable type of bus connection. Sensor hub 114 may also utilize an I2C bus for communicating with various sensors supported by IHS 100, such as the mode sensor 112, inertial measurement sensors 115 and sensors that may be used for determining a user's presence near the IHS 100. Sensor hub 114 may collect and processes data from such sensors using data fusion techniques in order to determine contextual information regarding the operational state of IHS 100 for use in managing the operation of peripherals coupled to IHS 100.

As illustrated, IHS 100 embodiments may utilize an embedded controller 120 that may be a motherboard component of IHS 100 and may include one or more logic units. In certain embodiments, embedded controller 120 may operate from a separate power plane from the main processors 101 and thus the operating system functions of IHS 100. Firmware instructions utilized by embedded controller 120 may be used to operate a secure execution environment that may include operations for providing various core functions of IHS 100, such as power management, management of operating modes in which IHS 100 may be physically configured and support for certain integrated I/O functions. In certain embodiments, the operations of the secure execution environment of embedded controller 120 may include operations describe herein for use in managing the operation of peripherals coupled to IHS 100.

Embedded controller 120 may also implement operations for interfacing with a power adapter 124 in managing power for IHS 100. Such operations may be utilized to determine the power status of IHS 100, such as whether IHS 100 is operating from battery power or is plugged into an AC power source. Embedded controller 120 may also implement operations in support of the detection of changes to the physical configuration of IHS 100 and in managing the modes corresponding to different physical configurations of IHS 100. For instance, in embodiments where IHS 100 is a laptop computer or a convertible laptop computer, embedded controller 120 may receive inputs from a lid position sensor 121 and utilize these inputs to determine whether the two sides of the laptop have been latched together to a closed position. In response to lid position sensor 121 detecting latching of the lid of IHS 100, embedded controller 120 may initiate operations for shutting down IHS 100 or placing IHS 100 in a low-power state. In certain embodiments, embedded controller 120 may be configured to place IHS 100 in a low-power state based on various conditions, such as based on a detected period of inactivity. Embedded controller 120 may rely on sensor hub 114 in order to process certain contextual inputs collected by the embedded controller 120 and the sensor hub 114. In some embodiments, embedded controller 120 and sensor hub 114 may communicate during low-power states via an out-of-band signaling pathway 125 that allows the processing of contextual inputs to be shared in various combinations between these two components.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
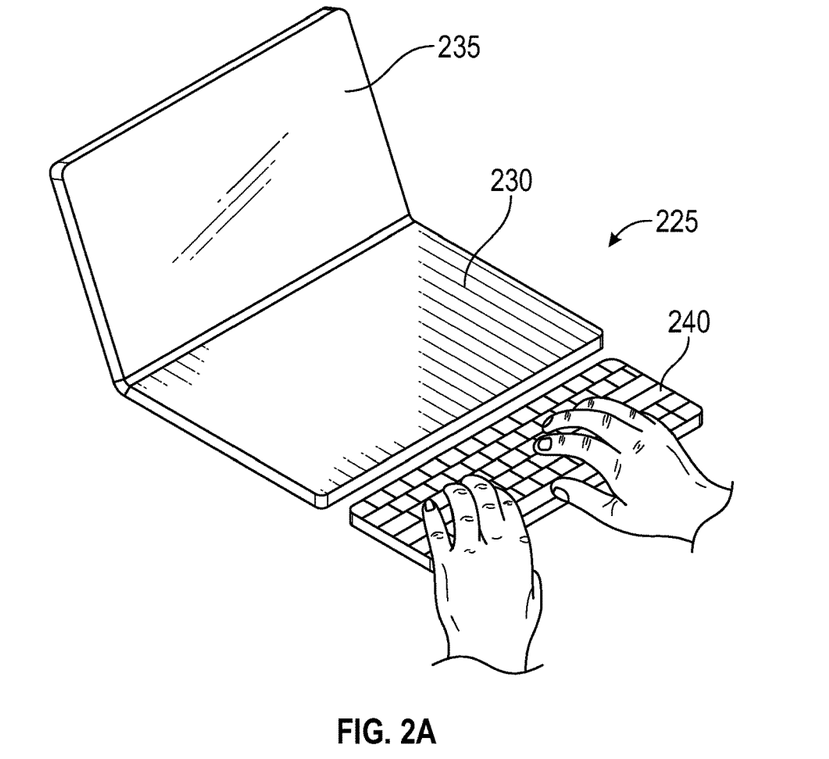
FIG. 2A is an illustration of an IHS configured in a laptop mode and further configured according to various embodiments for management of user contexts for the operation of peripherals coupled to the IHS.
Figure 2B:
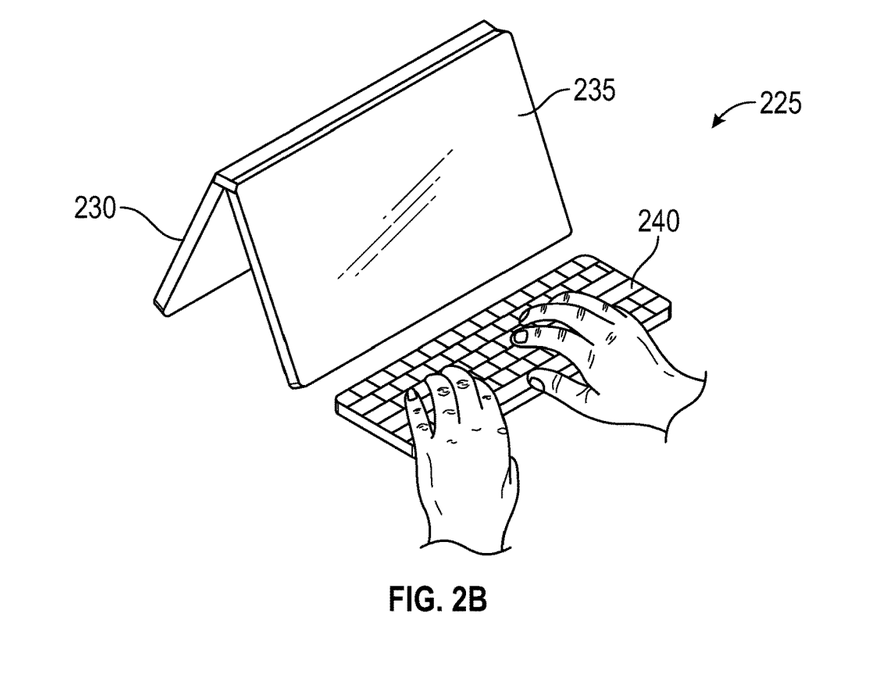
FIG. 2B is an illustration of an IHS configured in a tent mode and further configured according to various embodiments for management of user contexts for the operation of peripherals coupled to the IHS.

FIG. 2A is an illustration of a convertible IHS 225 that may be configured according to embodiments for managing the operation of peripherals that are coupled to the convertible IHS 225. In certain embodiments, the management of peripherals coupled to IHS 225 may account for the mode in which the convertible IHS 225 is physically configured. The IHS 225 of FIG. 2A is a convertible laptop 225 that is comprised of two panels 230 and 235 that may be rotated relative to each other about a hinge in order to support a variety of operating modes of the convertible IHS 225. These operating modes of a convertible IHS 225 may be referred to as postures of the IHS. In the embodiment of FIG. 2A, the IHS rests on a base panel 230 and a display panel 230 is rotated to face the user of the convertible IHS 225. When configured in this manner, the configuration of the convertible IHS 225 may be referred to as "laptop" mode.

In some embodiments, both panels 230 and 235 of the convertible IHS 225 may include integrated displays, such as integrated display device 108 described with regard to the IHS 100 of FIG. 1. As illustrated, convertible laptop 225 may utilize an external keyboard 240 that may be used on a tabletop or desk surface while using both panels 230, 235 as display devices. In some embodiments, a soft keyboard may be displayed by the base panel 230 such that no external keyboard 240 is necessary. As with a traditional, non-convertible laptop, a mouse or other pointing device may be utilized to operate the convertible laptop 225 while it is configured in the laptop mode of FIG. 2A. In addition, convertible IHS 225 may also support the use of additional pointing devices such as a stylus or pen via which a user may provide inputs to touchscreen displays integrated in the panels 230 and 235 of the convertible IHS 225.

Figure 2C:
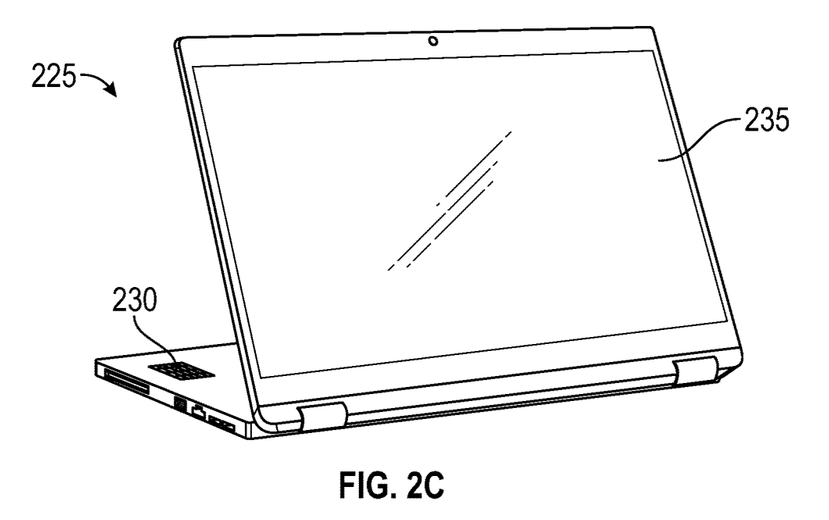
FIG. 2C is an illustration of an IHS configured in a kickstand mode and further configured according to various embodiments for management of user contexts for the operation of peripherals coupled to the IHS.

FIG. 2B is an illustration of an additional operating mode of the convertible laptop 225 of FIG. 2A. In FIG. 2B, the convertible laptop 225 is propped in a "tent" configuration in which the display panel 235 is being used as a display and the base panel 230 is disabled and used to prop the display panel 235 such that it faces the user. In the tent configuration, the keyboard 240 and/or various pointing devices may be used on a tabletop or desk surface in view of the display panel 235. In FIG. 2C, the convertible IHS 225 is configured in a mode that may be referred to as a "kickstand" configuration. In a kickstand posture, the convertible IHS 225 rests on the disabled base panel 230 and the display panel 235 is rotated past 270 degrees from the closed position such that the integrated display of panel 235 faces the user. In such a configuration, the user may operate the convertible laptop 225 using a removable keyboard 240 as well as using various pointing devices.

Figure 2D:
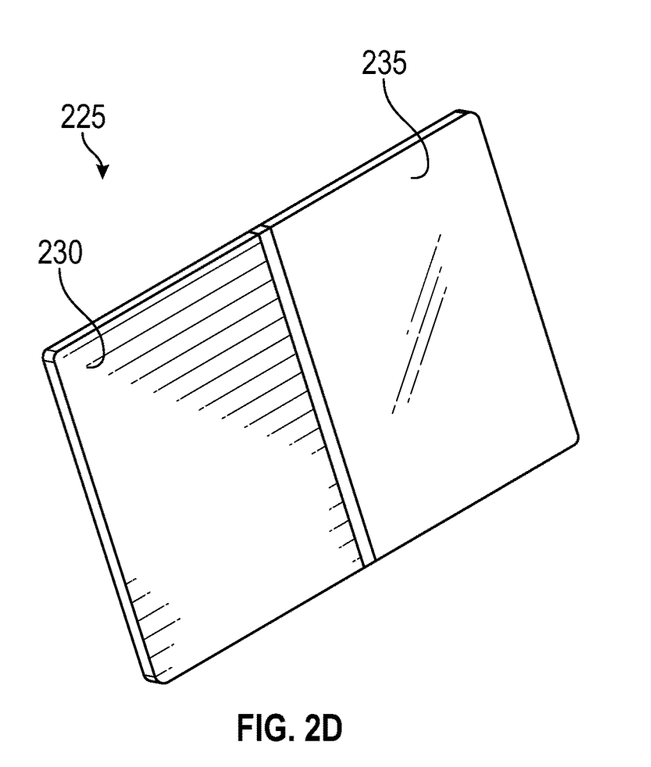
FIG. 2D is an illustration of an IHS configured in a landscape mode and further configured according to various embodiments for management of user contexts for the operation of peripherals coupled to the IHS.

In FIG. 2D, the convertible IHS 225 is configured in a "landscape" posture in which the panels 230, 235 may be opened 180 degrees and both integrated displays face the same direction. When configured in a landscape posture, the convertible IHS 225 may be placed on a flat surface such as a desk or table, or the convertible IHS 225 may be propped upwards such that the displays are tilted towards the user. An external keyboard 240 and various pointing devices may be utilized while the convertible IHS is in landscape mode. Convertible IHS 225 may be configured in various additional postures. For instance, convertible IHS 225 may be configured in a "book" mode by opening the panels 230, 235 between 90 and 180 degrees such that the IHS 225 can be turned on it's side and be held by a user like a traditional book or may rest on a flat surface like a bifold picture frame. In another "tablet" mode, the base panel is disable and the display panel is rotated open to its fullest extent until a touchscreen display integrated in the display panel may be utilized as a tablet.

Figure 3:
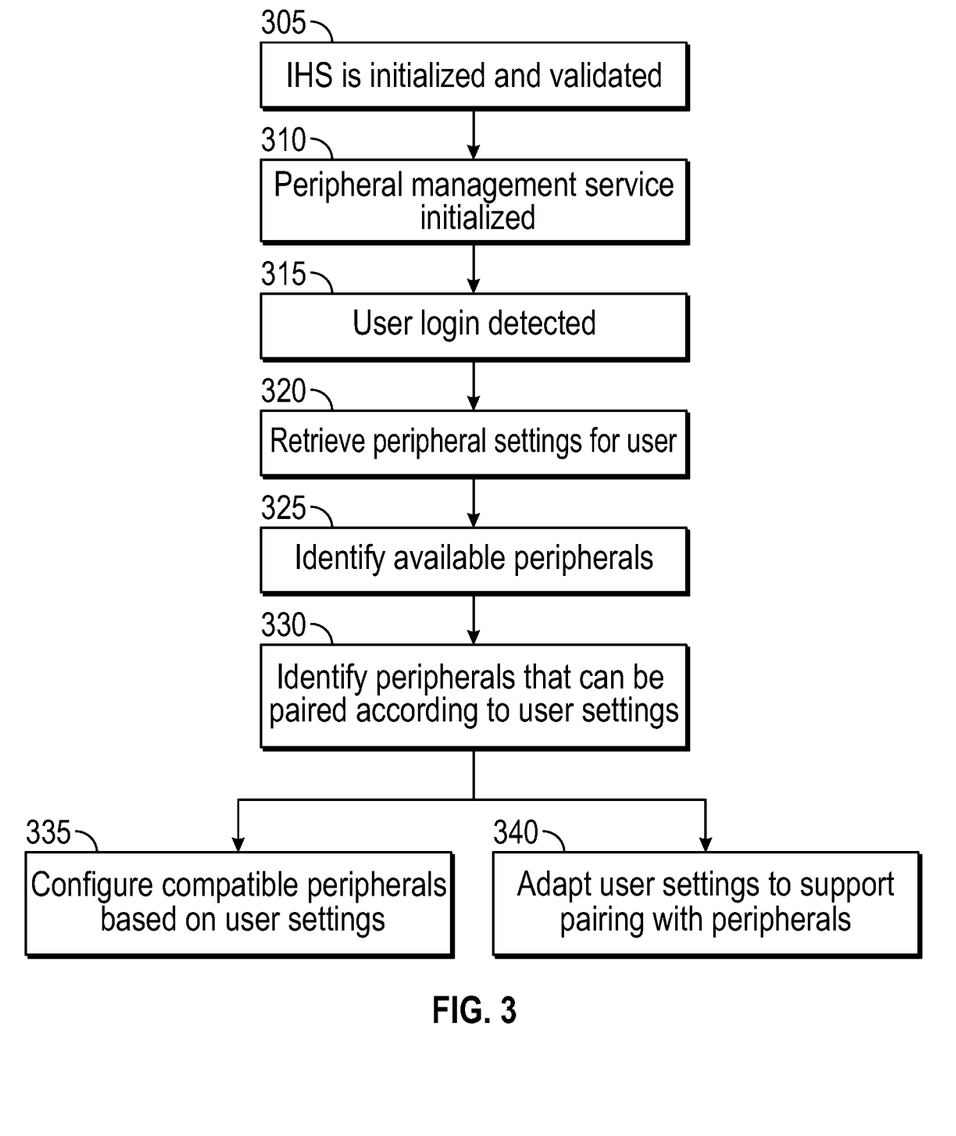
FIG. 3 is a flow chart illustrating certain aspects of a process according to embodiments for management of user contexts for the operation of peripherals coupled to the IHS.

FIG. 3 is a flow chart illustrating certain aspects of a process according to embodiments for management of user contexts for the operation of peripherals coupled to the IHS. The illustrated embodiment begins at block 305 with the initialization of an IHS. In certain embodiments, the integrity of the hardware components of the IHS may be validated via pre-boot security procedures. In such embodiments, the integrity of certain peripherals may be validated as part of such procedures. For instance, the firmware instructions utilized by an I/O controller that supports one or more peripherals may be validated prior to initializing such controllers, and in some cases prior to booting the operating system of the IHS. In certain embodiments, the validation of firmware instructions utilized by peripheral controller may detect whether the controller supports the described management of user contexts for the operation of peripherals supported by the controller.

Upon booting of the operating system of the IHS, at block 310, a peripheral management service is initialized as an operating system process. The peripheral management service may run until the operating system reports a user login event at block 315. Once the identity of the user has been confirmed by the login process, at block 320, the peripheral management service may retrieve peripheral settings for the particular user that has logged in. As described with regard to FIG. 1, an IHS configured according to embodiments may establish a connection with an enterprise network that supports management of a user's operation of peripherals devices such that the user experiences consistent peripheral device behavior using any IHS that is configured according to the embodiments described herein. In support of such peripheral device management, the peripheral management service may retrieve peripheral settings for a particular user from an enterprise network, such as a cloud network, where the peripheral device setting may include manually and/or automatically generated customizations for a the particular user's operation of peripheral devices.

At block 325, the peripheral management service may identify peripherals that are coupled to the IHS and that may be configured for operation by a particular user. In certain embodiments, the peripheral management service may retrieve a catalog of coupled peripherals from the operating system of the IHS, the BIOS and/or an embedded controller that may be used to implement certain core operations of the IHS, such as embedded controller 120 of FIG. 1. At block 330, each of the peripherals that are coupled to the IHS is evaluated for configuration according to the settings retrieved for the user. In certain instances, a peripheral coupled to an IHS may be configured directly based on the retrieved settings of the user. In certain instances, new peripheral devices may be coupled to an IHS for the first time. In such instance, a new peripheral may be similarly evaluated, at block 330, for configuration according to the user's retrieved settings.

In scenarios where a peripheral is compatible with the user's settings, at block 335 such peripherals are configured using these settings. The user is thus provided with familiar operation of peripherals upon logging in to an IHS, even if this is first time the user has operated this particular IHS. Moreover, the peripheral devices of an IHS may be configured in this manner for a particular user even if the user's operation of the IHS will be a one-time event. In some scenarios, the available user settings that are retrieved by the peripheral management service may not be directly applicable to a peripheral. For instance, retrieved configurations for a particular user may include customized keyboard configurations that include both user-defined key mappings and key entry tolerances and autocorrections that have been automatically defined through machine learning models that have been trained based on observations of the user's key entries. However, such machine learning models may be specific to a specific keyboard, such as a type of external keyboard that is frequently utilized by the user. Accordingly, such machine learning generated keyboard customizations may be loaded, at block 335, for a user at any IHS that includes a keyboard that is of the same type as the keyboard used to generate the machine learning key entry model.

However, if a user logs into an IHS that uses an integrated keyboard or a different type of keyboard, only certain of the customized keyboard configurations may be applicable. Accordingly, at block 340, the peripheral management service may adapt the retrieved configurations in order to provide the user with the customizations that are supported by the available peripherals. For instance, upon detecting the use of an integrated keyboard, user settings that provide customized key mappings, such as customized keyboard shortcuts and macros, may be applied while key entry modifications that were automatically generated via machine learning through use of an external keyboard may be disregarded during use of this IHS that utilizes an integrated keyboard. In certain scenarios, keyboard operations may be customized through defining specialized operations for groups of keys located within an area of the keyboard, rather than individual keys. In such scenarios, a user's peripheral settings that utilize key zones may be disregarded when utilizing certain types of keyboards and/or based on the mode in which an IHS has been configured.

In other instances, user settings may be similarly adapted by modifying configurations to account for differences in the peripherals in use by a particular IHS. For instance, if a user's customizations include pointing device sensitivity settings, such settings may be adapted for use on a larger or smaller touchscreen than used to generate the pointing device sensitivity settings. In another example, display settings defined for a particular user may be modified according the display that is in use. For instance, display settings may be retrieved for a particular user that specify preferred display resolution settings and also specify screen brightness settings. However, upon logging in to an IHS that utilizes a display that does not support the preferred display resolution, such incompatible resolution settings may be disregarded, but the screen brightness settings may still be applied, thus providing the user with some level of consistency in the operation of peripheral display devices. In a similar manner, keyboard zones that are defined in a user's peripheral settings may be adapted to account for different sized keyboards by adding or subtracting from the keys that are mapped to particular zones.

Figure 4:
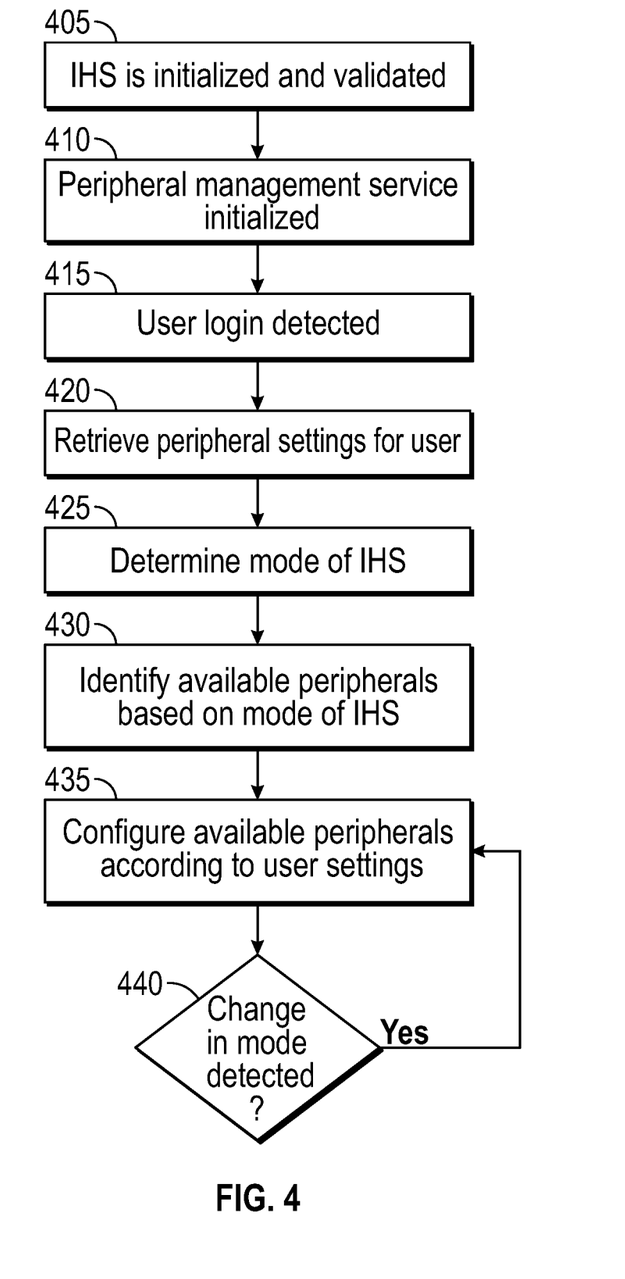
FIG. 4 is a flow chart illustrating certain additional aspects of a process according to embodiments for management of user contexts for the operation of peripherals coupled to the IHS.

FIG. 4 is a flow chart illustrating certain aspects of an additional process according to embodiments for management of user contexts for the operation of peripherals coupled to a convertible IHS that may be configured in various modes. In the embodiment of FIG. 3, the operation of peripherals is managed based on the context of the IHS that is in use. Using the described embodiment of FIG. 3, consistent operation of peripherals is provided across different IHSs that may be operated by a user. In the embodiment of FIG. 4, an additional or alternate IHS mode context may be considered in the management of peripherals for operation by a particular user. As described with regard to FIGS. 2A-D, some IHSs are convertible into various different physical configurations that provide distinct modes of operation, such as operation as a tablet or as a laptop. In the embodiment of FIG. 4, peripherals may be managed based on the mode in which a convertible IHS has been configured by the user.

As with the embodiment of FIG. 3, the process of FIG. 4 may begin, at block 405, with the initialization of an IHS. In certain embodiments, the integrity of the hardware components of the IHS may be validated, as described above, via pre-boot security procedures. Upon booting the IHS, at block 410, the peripheral management service is initialized and the peripheral management service waits until a user login event is detected at block 415. Using the confirmed identity of the user, at block 420, the peripheral settings for the particular user are retrieved by the peripheral management service. However, before applying the retrieved peripheral settings, at block 430, the peripheral management service determines the mode in which the IHS is physically configured.

In certain embodiments, the peripheral management service may configure peripheral devices according to the mode in which a convertible IHS is configured. For instance, if the IHS is configured in a laptop mode and an external mouse is coupled to the IHS, a first configuration of pointing device sensitivity settings may be selected from the retrieved peripheral settings of the user. However, if the IHS is configured in a tablet mode and no external mouse is detected, a second configuration of pointing device sensitivity settings may be selected, where the second configuration of settings is specialized for user inputs via a stylus or a finger rather than using a mouse. In another illustrative example, a user may prefer use of high-resolution display settings while using an IHS for work-related tasks performed in laptop mode, but may prefer use of lower resolution display settings when the IHS is configured in a tablet mode and the user is most likely using the IHS for email and web browsing and would rather conserve the charge of the IHS battery. A user is thus able to define settings for the operation of peripheral devices with the appropriate settings applied based on the mode in which the IHS is physically configured. Additionally, the peripheral device settings for a user may be utilized in a consistent manner by that user while utilizing different IHSs that may have varying capabilities and utilize different peripheral devices.

In certain embodiments, mode determinations may also incorporate user input that may be provided via the operating system of the IHS. For instance, when configuring an IHS for use in delivering a presentation, a user may select a presentation mode that is associated with peripheral settings customized for that context. When the user is configuring an IHS for use as a multimedia viewer, the user may select a multimedia mode that is associated with different peripheral settings. In certain embodiments, mode determinations bay be further determined based on the docking status of an IHS. For instance, when docked to a specific docking station, a work mode may be indicated, while a different docking station may indicate configuration of an IHS in a different mode. In certain embodiments, mode determinations may also consider the applications that are presently in use. The use of word processing or graphic design applications may indicate use of an IHS in a work mode that utilizes one set of peripheral settings, while use of an application for viewing streaming media may signal use of a different set of peripheral settings Once the mode of the IHS and the available peripherals have been determined, at block 435, the available peripherals are configured using the available settings, or as described with regard to FIG. 3, using applicable aspects of the available settings that are compatible with the available peripherals. Operation of the IHS proceeds with the user's particular peripheral settings in use. As described with regard to FIG. 1, various sensors of an IHS may be utilized in order to detect changes in the mode in which an IHS is physically configured, including both changing the hinge angle at which an IHS is rotated and/or changing the orientation at which the IHS is positioned. At block 440, any such changes in the mode of the IHS are detected and, based on the new mode, any changes to the configuration of peripherals are applied. As described, mode determinations may be additionally based on the applications that are presently in use and/or docking status Accordingly, any changes in docking status and/or the applications that are being used may be detected and may indicate a change in the mode of the IHS, and thus a change in peripheral device settings. In this manner, the operation of the peripheral devices adapts to the context of the mode in which the user has configured an IHS.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for managing the operation of peripheral devices coupled to a first Information Handling System (IHS), the method comprising:
   detecting a login by a first user of the first IHS, wherein the login is detected by a peripheral device management process of an operating system of the first IHS, wherein the peripheral devices coupled to the first IHS at a first location comprise user I/O (input/output) devices that are decoupled from the first IHS when the first user transports the first IHS to a second location;
   retrieving, from a remote management service, a plurality of peripheral device settings that customize the operation of the respective peripheral devices for operation by the first user;
   determining a context of operation of the first IHS by the first user, wherein the context comprises the first user's operation of one or more software programs of the operating system of the IHS;
   selecting a plurality of settings from the retrieved peripheral device settings of the first user, wherein the settings are selected based the context of operation of the first IHS by the first user, wherein the selected settings adapt the operation of the peripheral devices for the first user's operation of the one or more software applications; and
   configuring the first plurality of peripheral devices for operation by the first user, wherein the first plurality of peripheral devices are configured for operation of the one or more software application by the first user based on the selected settings.

2. The method of claim 1, wherein the first IHS is a dual-panel, convertible IHS, and wherein a physical posture of the first IHS is configured through positioning of the dual panels, and wherein the context of use of the first IHS is further determined at least in part based on the physical posture in which the first user has configured the first IHS while using the one or more software programs.

3. The method of claim 1, wherein the peripheral devices coupled to the first IHS comprise user I/O devices that comprise one or more of a keyboard, a monitor and a pointing device.

4. The method of claim 1, further comprising identifying one or more I/O controllers of the first IHS that support the user I/O operations of the peripheral devices coupled to the first IHS.

5. The method of claim 1, further comprising:
   detecting a login by the first user of the first IHS at the second location;
   retrieving, from the remote management service, the plurality of peripheral device settings associated with the first user, wherein user I/O peripheral devices coupled to the first IHS at the second location comprise user I/O (input/output) devices that are decoupled from the first IHS when the first user transports the first IHS back to the first location;
   determining a context of operation of the first IHS by the first user at the second location;
   selecting a plurality of settings from the retrieved peripheral device settings of the first user, wherein the settings are selected based the context of operation of the first IHS by the first user at the second location; and
   configuring the plurality of peripheral devices at the second location for operation by the first user.

6. The method of claim 2, wherein the physical posture of the first IHS comprises at least one of a tablet mode, a laptop mode, a tent mode, a landscape mode and a book mode.

7. The method of claim 4, further comprising validating firmware of the I/O controllers as supporting management operations by the peripheral device management process.

8. The method of claim 6, wherein the first IHS further comprises a plurality of sensors for detecting transitions between the physical postures by the first user, and wherein the context of operation of the first IHS by the first user is further determined at least in part based on the sensor inputs.

9. The method of claim 1, wherein the context of operation of the first IHS by the first user is further determined at least in part based on a docking station by which the peripheral devices are coupled to the first IHS.

10. A first Information Handling System (IHS) configured for managing the operation of peripheral devices coupled to the first IHS, the first IHS comprising:
    one or more processors; and
    a memory device coupled to the one or more processors, the memory device storing computer-readable instructions that, upon execution by the one or more processors, cause the system to:
        detect a login by a first user of the first IHS, wherein the login is detected by a peripheral device management process of an operating system of the first IHS, wherein the peripheral devices coupled to the first IHS at a first location comprise user I/O (input/output) devices that are decoupled from the first IHS when the first user transports the first IHS to a second location;
        retrieve, from a remote management service, a plurality of peripheral device settings that customize the operation of the respective peripheral devices for operation by the first user;
        determine a context of operation of the first IHS by the first user, wherein the context comprises a docking status of the first IHS;
        select a plurality of settings from the retrieved peripheral device settings of the first user, wherein the settings are selected based the context of operation of the first IHS by the first user, wherein the selected settings adapt the operation of the peripheral devices for the first user's operation of the one or more software applications; and
        configure the first plurality of peripheral devices for operation by the first user, wherein the first plurality of peripheral devices are configured based on the selected settings.

11. The IHS of claim 10, wherein the first IHS is a dual-panel, convertible IHS and wherein the physical posture of the first IHS is configured through positioning of the dual panels, and wherein the context of use of the first IHS is determined at least in part based on the physical posture, wherein the context further comprises the first user's operation of one or more software programs of an operating system of the IHS while configured in the physical posture by the first user.

12. The IHS of claim 10, wherein the first IHS further comprises one or more I/O controllers that support the I/O operations of the peripheral devices coupled to the first IHS at the first location.

13. The IHS of claim 12, wherein the computer-readable instructions, upon execution by the one or more processors, further cause the system to validate firmware of the I/O controllers as supporting management operations by the peripheral device management process.

14. The IHS of claim 10, wherein the docking status indicates the first IHS is docked to a specific docking station.

15. The IHS of claim 11, wherein the physical posture of the first IHS comprises at least one of a tablet mode, a laptop mode, a tent mode, a landscape mode and a book mode, and wherein transitions in the physical posture are detected based on inputs from one or more sensors of the first IHS.

16. A computer-readable storage device having program instructions stored thereon for managing the operation of peripheral devices coupled to a first Information Handling System (IHS), upon execution by one or more processors, the program instructions cause the one or more processors to:
- detect a login by a first user of the first IHS, wherein the login is detected by a peripheral device management process of an operating system of the first IHS, wherein the peripheral devices coupled to the first IHS at a first location comprise user I/O (input/output) devices that are decoupled from the first IHS when the first user transports the first IHS to a second location;
- retrieve, from a remote management service, a plurality of peripheral device settings that customize the operation of the respective peripheral devices for operation by the first user;
- determine a context of operation of the first IHS by the first user, wherein the context comprises the first user's operation of one or more software programs of the operating system of the IHS;
- select a plurality of settings from the retrieved peripheral device settings of the first user, wherein the settings are selected based the context of operation of the first IHS by the first user, wherein the selected settings adapt the operation of the peripheral devices for the first user's operation of the one or more software applications; and
- configure the first plurality of peripheral devices for operation by the first user, wherein the first plurality of peripheral devices are configured for operation of the one or more software application by the first user based on the selected settings.

17. The computer-readable storage device of claim 16, wherein the first IHS is a dual-panel, convertible IHS, and wherein a physical posture of the first IHS is configured through positioning of the dual panels, and wherein the context of use of the first IHS is further determined at least in part based on the physical posture in which the first user has configured the first IHS while using the one or more software programs.

18. The computer-readable storage device of claim 17, wherein the context of operation of the first IHS by the first user is further determined at least in part based on a docking station by which the peripheral devices are coupled to the first IHS.

19. The computer-readable storage device of claim 16, wherein the peripheral devices coupled to the first IHS comprise user I/O devices that comprise one or more of a keyboard, a monitor and a pointing device.

20. The computer-readable storage device of claim 17, wherein the physical posture of the first IHS comprises at least one of a tablet mode, a laptop mode, a tent mode, a landscape mode and a book mode.

* * * * *